March 22, 1960  R. TRUBERT  2,929,534
LIQUID METER

Filed July 24, 1957  3 Sheets-Sheet 1

INVENTOR
RENÉ TRUBERT
By Linton and Linton
ATTORNEYS

March 22, 1960 R. TRUBERT 2,929,534
LIQUID METER
Filed July 24, 1957 3 Sheets-Sheet 3

INVENTOR
RENÉ TRUBERT
By Linton and Linton
ATTORNEYS

United States Patent Office 2,929,534
Patented Mar. 22, 1960

2,929,534

LIQUID METER

René Trubert, Viroflay, France

Application July 24, 1957, Serial No. 673,870

4 Claims. (Cl. 222—20)

This present invention relates in general to the metering of liquids and has particular reference to an improved liquid meter whereby a metered volume of liquid may be caused to flow from a source of liquid under pressure, this volume of liquid being adapted to be selected beforehand and each time by actuating a knob associated for example with a pointer movable along a dial scale.

According to this present invention, the liquid flow takes place through a hydraulic relay valve mechanism the closing of which is controlled by the release of a trip-lever mechanism which is tripped to produce the flow of liquid, while a turbine-rotor volumetric measuring device or rate meter, disposed after the aforesaid relay valve mechanism, actuates a metering mechanism or quantity meter adjusted beforehand by means of the control knob so that the metering mechanism, upon completion of its operation, will cause the trip-lever mechanism to be released, thereby stopping the flow of liquid after the desired, metered volume of liquid has been delivered by the apparatus.

The rate meter may be of any known type of construction and comprise for example an immersed reducing gear and an indicator mechanism located outside the chamber through which the liquid is caused to flow. Thus, by simply operatively connecting this indicator mechanism with the index-carrying quantity-meter mechanism, it is possible, when resetting the latter mechanism, to release the trip-lever mechanism operatively connected to a valve-carrying arm mounted inside the liquid chamber.

In order to afford a clearer understanding of this present invention and of the manner in which the same may be carried out in practice, reference will now be made to the attached drawings forming part of this specification and illustrating diagrammatically by way of example a typical embodiment of the present invention. In the drawings.

Figure 1:
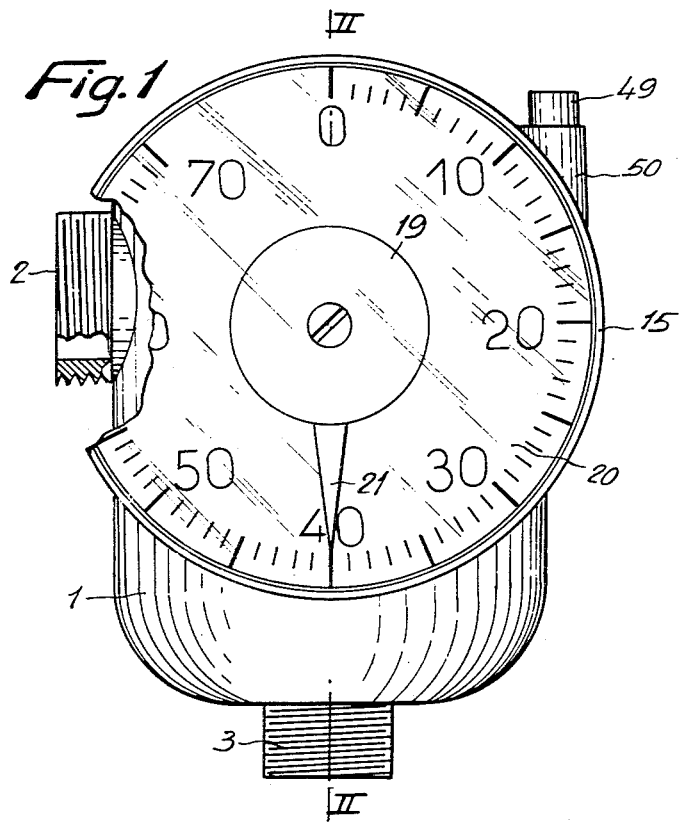
Figure 1 is a front view of the apparatus.
Figure 2:
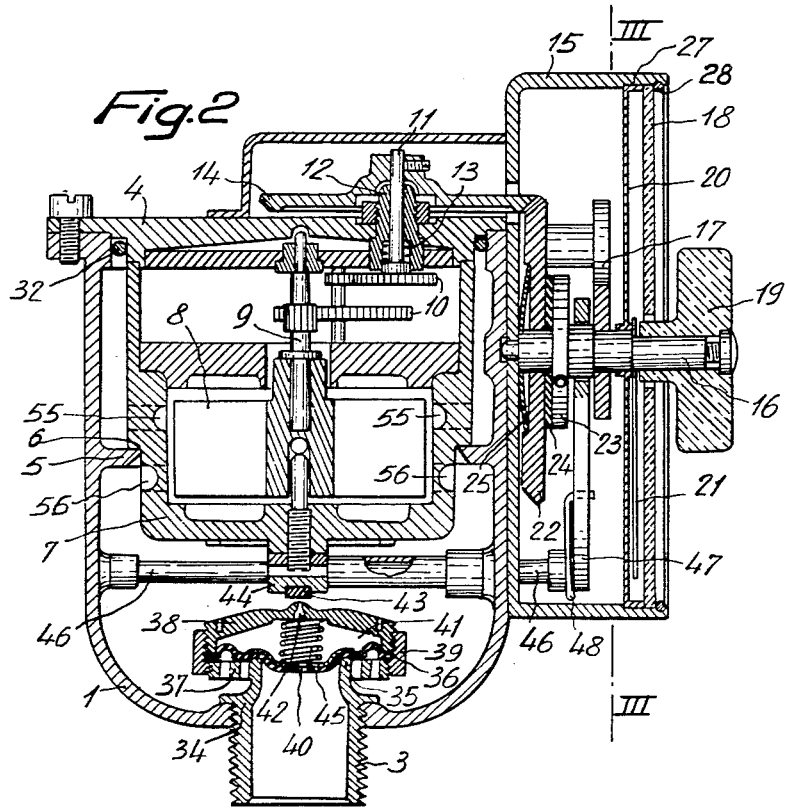
Figure 2 is a vertical section of the apparatus which is taken upon the line II—II of Figure 1.
Figure 3:
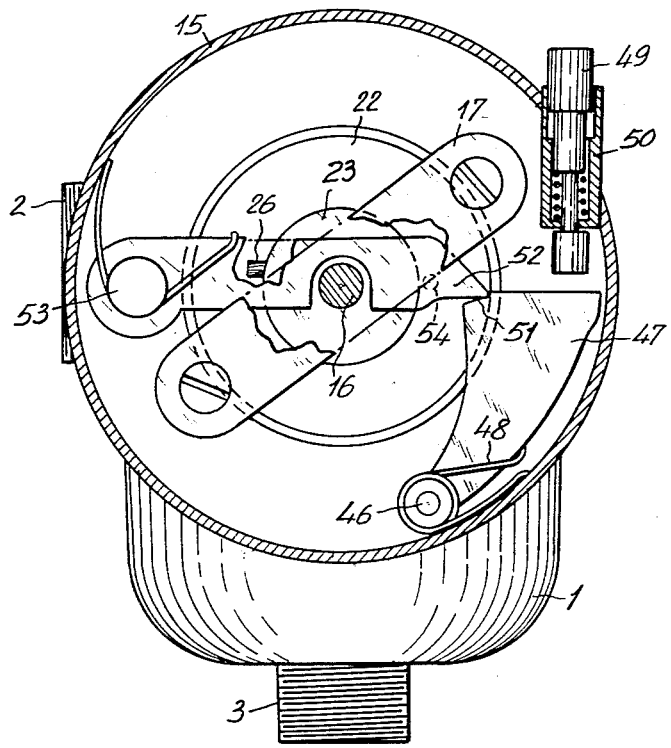
Figure 3 is a diagrammatic section showing the ratemeter mechanism, this section being taken upon the line III—III of Figure 2.

Referring to Fig. 1, the body 1 of the apparatus has substantially the form of a cylindrical cup and comprises an outlet fitting 2 and an inlet fitting 3 for the liquid. The inlet fitting 3 is coaxial to the body 1 and the axis of the laterally-extending outlet fitting 2 is directed at right angles to the axis of the body 1. The upper aperture of the body 1 is closed in a fluid-tight manner by a detachable cover or lid (Fig. 2).

At right angles to the axis of the body 1 and substantially at mid-height thereof the body 1 comprises an inner partition 5 in which a cenral aperture 6 is formed and adapted to receive the shouldered bottom of the stator 7 of a rate-meter, the upper edge of this aperture 6 constituting a bearing shoulder for the larger upper portion of the stator 7. This stator constitutes in turn a cylindrical case enclosing the rotor 8, the arbor 9 of which actuates a gear reducing mechanism 10 housed between the meter cover and the cover of the body 1. The output shaft 11 of the reducing gear 10 exends through the cover 4 and is journalled in a bearing socket 12 secured on this cover and provided internally with a shaft packing 13. The upper end of this output shaft 11 has wedged thereon a bevel wheel 14.

Mounted laterally on the body 1 is a cylindrical case 15 the axis of which extends at right angles to that of the body 1. This case 15 is adaped to house the main component elements of the quantity-meter mechanism. Coaxially to the case 15 is a shaft 16 having one end journalled in the bottom of the case and its intermediate portion journalled in the central aperture of a bearing plate or support 17 disposed transversely of the case 15. Moreover, this shaft 16 extends through a central aperture formed in a transparent front glass window 18 of the case, the outer end of this shaft 16 carrying a control knob 19. On the shaft portion located between the glass window 18 and a dial 20 there is secured a pointer 21 adapted to move along a scale formed on the dial 20. Close to the bottom of the case 15 another bevel wheel 22 is loosely mounted for rotation on the shaft 16 and constantly in meshing engagement with the bevel wheel 14 of which one portion projects into the case 15 through an aperture formed in the bottom wall thereof.

On the shaft 16 and close to the bevel wheel 22 a plate or disc 23 is wedged between the wheel 22 and plate 17; between the bevel wheel 22 and the plate 23 there is mounted a friction disc 24 constantly compressed by the bevel wheel 22 urged by a dished spring washer 25 tending to move the bevel wheel 22 away from the bottom of the case 15. The plate 23 carries a radial pin 26 adapted to operate the trip-lever mechanism to be described presently.

The dial 20 (Fig. 2) bears on an inner shoulder of the case 15 and is held in spaced relationship to the glass window 18 by a cylindrical spacer ring 27, the fixation of these three elements on the case 15 being effected by a circlips 28 fitting in a groove formed in the front inner edge of the case 15.

Figure 4:
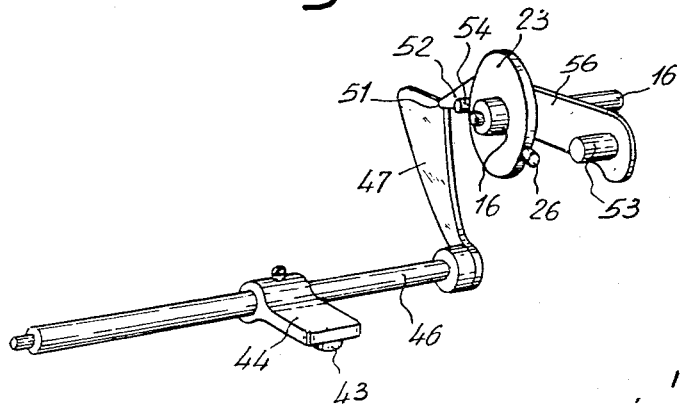
Figure 4 is a detail view showing in perspective the component elements of the trip-lever mechanism.

The inlet 3 of the apparatus comprises a neck portion 34 constituting the supporting base of the valve controlling the flow of liquid. The upper or top portion 35 of this valve base constitutes an annular seat adapted to co-act with a diaphragm valve 36 the outer peripheral edge of which is clamped between a perforated ring 37 fixed with the top portion 35 and a screw-cap 38 screwed in an outer ring nut 39 screwed in turn on the ring 37, as shown. The diaphragm constituting the valve closing member has a small axial hole 40 formed therethrough to connect the liquid inlet with the counter-pressure chamber 41 formed between the diaphragm 36 and the screw-cap 38. The latter has a small leakage hole 42 of suitable calibrated size formed therethrough and adapted to be obturated by a valve member 43 carried by an arm 44 of the trip-lever mechanism (Fig. 4) after the valve mechanism in the direction of flow. In the counter-pressure chamber 41 a spring 45 constantly urges the diaphragm 36 to its closing position when the hole 42 sets up a counter-pressure in the chamber 41.

The valve-carrying arm 44 (Fig. 4) is fixed with a release mechanism shaft 46 extending through the bottom of the case 15 and the wall of the body 1 across a fluid-tight passage. This shaft 46 carries internally of the case 15 a bent lever 47 constantly urged by a trip spring 48 to the position in which the valve member 43 closes the hole 42 (release position). The upper horizontal portion of this lever is located just under a spring-urged push-button 49 mounted in a socket 50 through the wall of the case 15 and comprises a catch 51 co-acting with a latch 52 pivoted on a fulcrum pin 53 and carrying a lock pin 54 adapted to engage the radial pin 26 so that upon completion of the return stroke or movement the pin 26 of plate 23 lifts the latch 52 and releases the lever 47 to permit the tripping rotation of this lever. The device is so arranged that the lever 47 may be restored to its locked position relative to the latch by depressing the push-button 49.

As the meter itself of Fig. 2 is of the well-known rate-measuring type it will not be described in detail. However, it may be pointed out that around the rotor 8 the stator 7 has formed therethrough two series of oblique horizontal passage holes, opposite to the radial direction, which comprise outlet passage holes 55 and inlet passage holes 56 (Fig. 2) on either side of the intermediate horizontal partition 5. The meter may also comprise an adjustment member, for example, according to the known arrangement, a screw adapted to be turned in or out from the outside and uncovering more or less additional outlet apertures formed through the bottom of the stator, that is, by-passing the oblique outlet passages 56.

The operation of the liquid meter of the present invention will be readily understood from the above description. This operation is briefly summarized hereafter. In the unoperated position the lever 47 (Fig. 4) is released and the trip-lever mechanism, by means of its valve member 43, closes the leakage hole 42 in the counter-pressure chamber, so that the main valve diaphragm 36 is seated and prevents the liquid from flowing from the source of liquid under pressure to the delivery outlet.

When it is desired to deliver a predetermined quantity of liquid, the operator simply actuates the metering knob 19 to bring the pointer 21 on the corresponding line of the scale carried by the dial 20. As this operation is accomplished the plate 23 fixed with the metering shaft 16 carrying the knob 19 is rotated through a certain angle and its radial pin 26 is moved through a corresponding angle away from the position in which it lifts the latch pin 54 of the latch 52.

After the desired volume of liquid has thus been preselected the flow of liquid is obtained by depressing the push-button 49 which sets the trip-lever mechanism against the resistance of its spring 48, by causing the catch 51 to engage the latch 52, thus retaining the lever 47 in its cocked position. During this actuation the hole 42 is uncovered and releases the counter-pressure in the chamber 41 while permitting the movement of the diaphragm 36 away from its seat and therefore the entrance of liquid into the rate meter. The rate-meter mechanism is thus driven and, through the friction clutch or coupling of the disc 24, restores the quantity-meter mechanism and its plate 23 to its initial position as a function of the liquid output.

The end of the return movement corresponds to the delivery of the preset volume of liquid and at this time the radial pin 26 of plate 23 engages the pin 54 of latch 52, thereby lifting the latter and releasing the catch 51 of lever 47 (Fig. 4), so that the spring 48 is allowed to expand and cause the valve member 43 to close the hole 42. The counter-pressure is built up again in the chamber 41, the diaphragm 36 is re-seated and the apparatus is ready for another liquid-metering operation.

If it is desired to deliver hot water at a well-defined temperature, the liquid meter may be fed from the output of a thermostatic mixer supplying water at the desired temperature by automatically mixing hot water and cold water.

Although only one example of a typical embodiment of this invention has been shown and described herein, it will be readily understood that various modifications may be brought thereto without departing from the spirit and scope of the invention as set forth in the appended claims.

I claim:

1. A liquid meter for liquid under pressure capable of delivering predetermined quantities of liquid, comprising a housing having an inlet and outlet opening, a rate meter mounted in said housing for receiving liquid from said inlet opening, a membrane counterpressure closing valve controlling said inlet opening, a quantity meter, means for presetting said quantity meter to the desired output volume of liquid, further means for operatively connecting said rate meter and quantity meter with each other, a release mechanism associated with and controlled by said quantity meter upon completion of its operative movement for setting up the counterpressure in said valve and automatically discontinuing the flow of liquid when the desired volume has been delivered, and means adapted to trigger said release mechanism for causing said liquid to flow and then measuring its output.

2. In a liquid meter having a diaphragm controlled inlet, means for closing said diaphragm on said inlet after a predetermined volume of liquid has passed through said inlet comprising a plate operatively connected to said meter to be driven thereby, a pin radially extending from said plate, a pivotally mounted latch member, a rotatably mounted rod, a lever fixedly connected to said rod and having a catch capable of being engaged by said latch member, a latch pin connected to said latch member and positioned for being engaged by said plate pin upon said plate being driven through a given angle lifting said latch member from said lever catch, resilient means tending to pivot said lever when out of engagement with said latch member, said diaphragm having a small opening, a chamber provided above said diaphragm for receiving liquid from said diaphragm opening, said chamber having an opening therein, and a control member connected to said rod for closing said chamber opening upon the pivoting of said lever creating a counterpressure in said chamber closing said diaphragm on said inlet.

3. In a liquid meter as claimed in claim 2, a trigger for said closing means comprising a push member capable of engaging and pivoting said lever against the action of its resilient means away from said latch member and said control member from said chamber opening releasing the counterpressure in said chamber whereby said diaphragm opens said inlet and resilient means tending to move said latch member towards and into engagement with said lever catch normally preventing the pivoting of said lever.

4. A liquid meter as claimed in claim 1, wherein said connecting means includes a shaft for presetting said quantity meter, a gear driven by said rate meter and loosely mounted on said shaft, a plate on said shaft for operating said release mechanism, a friction disc freely mounted on said shaft between said gear and said plate and resilient means tending to move said gear against said friction disc and thus being coupled with said plate for driving the same.

References Cited in the file of this patent

UNITED STATES PATENTS

| | | |
|---|---|---|
| 867,587 | Moore | Oct. 8, 1907 |
| 958,664 | Moore | May 17, 1910 |
| 1,079,104 | Bowser | Nov. 18, 1913 |
| 1,772,260 | Marden | Aug. 5, 1930 |
| 2,012,563 | Hazard | Aug. 27, 1935 |
| 2,761,587 | Schantz | Sept. 4, 1956 |
| 2,846,119 | Robbins | Aug. 5, 1958 |